United States Patent
Yang et al.

(10) Patent No.: US 8,664,998 B2
(45) Date of Patent: Mar. 4, 2014

(54) ADAPTIVE FILTER CIRCUIT FOR SAMPLING A REFLECTED VOLTAGE OF TRANSFORMER IN A POWER CONVERTER AND METHOD THEREOF

(75) Inventors: Ta-Yung Yang, Mulpitas, CA (US); Li Lin, Taipei (TW); Jung-Sheng Chen, Kaohsiung (TW); Chih-Hsien Hsieh, Changhua County (TW); Yue-Hong Tang, Nantou County (TW)

(73) Assignee: System General Corporation, Taipei Hsien (TW)

( * ) Notice: Subject to any disclaimer, the term of this patent is extended or adjusted under 35 U.S.C. 154(b) by 34 days.

(21) Appl. No.: 13/336,141

(22) Filed: Dec. 23, 2011

(65) Prior Publication Data

US 2012/0212287 A1 Aug. 23, 2012

Related U.S. Application Data

(60) Provisional application No. 61/444,173, filed on Feb. 18, 2011.

(51) Int. Cl.
*H03K 5/00* (2006.01)

(52) U.S. Cl.
USPC ............ 327/337; 327/514; 327/554; 327/558

(58) Field of Classification Search
USPC .................. 327/551–559, 336–337, 509, 514
See application file for complete search history.

(56) References Cited

U.S. PATENT DOCUMENTS

| 5,554,944 | A  | * | 9/1996  | Van Buul et al. ............... 327/91 |
| 6,111,606 | A  | * | 8/2000  | Ikeda ............................ 348/241 |
| 7,135,681 | B2 | * | 11/2006 | Yamaguchi ................. 250/336.1 |

* cited by examiner

*Primary Examiner* — Dinh T. Le
(74) *Attorney, Agent, or Firm* — Bacon & Thomas, PLLC

(57) ABSTRACT

An adaptive filter circuit for sampling a reflected voltage of a transformer of a power converter includes a first switch for receiving the reflected voltage, a resistor having a first terminal and a second terminal, the first terminal of the resistor being coupled to the first switch, a capacitor coupled to the second terminal of the resistor for holding the reflected voltage, and a second switch coupled to the resistor in parallel, wherein the resistor and the capacitor develop a filter for sampling the reflected voltage which is sampled without filtering by the filter in a first period during a disable period of a switching signal and also sampled with filtering by the filter in a second period during the disable period of the switching signal.

26 Claims, 4 Drawing Sheets

ADAPTIVE FILTER CIRCUIT FOR SAMPLING A REFLECTED VOLTAGE OF TRANSFORMER IN A POWER CONVERTER AND METHOD THEREOF

BACKGROUND OF THE INVENTION

1. Field of the Invention

The present invention relates to a circuit for a primary-side controlled power converter, and more particular to an adaptive filter circuit for a primary-side controlled power converter.

2. Description of the Prior Art

FIG. 1 shows a schematic circuit of a conventional primary-side controlled power converter. The primary-side controlled power converter comprises a transformer 10 including a primary winding $N_P$, a secondary winding $N_S$, and an auxiliary winding $N_A$. An input voltage $V_{IN}$ of the power converter is supplied to the primary winding $N_P$. A switching controller 100 is coupled to a voltage divider formed by resistors 51 and 57 and samples a reflected voltage $V_A$ of the auxiliary winding $N_A$ of the transformer 10 through the voltage divider. One terminal of the resistor 51 is connected to the auxiliary winding $N_A$ of the transformer 10, and the other terminal of the resistor 51 is connected to one terminal of the resistor 57. The other terminal of the resistor 57 is coupled to ground. The resistor 51 is connected to the resistor 57 in series. Based on the reflected voltage $V_A$, a signal $V_S$ is generated at the join of the resistor 51 and the resistor 57 and applied to a detection terminal VS of the switching controller 100. The reflected voltage $V_A$ and the signal $V_S$ are correlated to an output voltage $V_O$ of the power converter. The primary-side controlled power converter further comprises a rectifier 40 and a capacitor 45. An anode of the rectifier 40 is connected to the resistor 51 and the auxiliary winding $N_A$. A cathode of the rectifier 40 is connected to the capacitor 45. A supply voltage $V_{CC}$ is supplied to a supply terminal VCC of the switching controller 100, which is connected to a join of the cathode of the rectifier 40 and the capacitor 45. An anode of a rectifier 60 is connected to the secondary winding $N_S$ of the transformer 10, and a cathode of the rectifier 60 is connected to an output capacitor 65. A load 70 is connected to the output capacitor 65 in parallel, and the output voltage $V_O$ is generated at one terminal of the load 70.

The switching controller 100 receives the signal $V_S$ which can be regarded as a voltage feedback signal correlated to the output voltage $V_O$ of the power converter. In responsive to the voltage feedback signal, the switching controller 100 generates a switching signal $S_W$ to switch a power transistor 20 and the transformer 10, so as to regulate the output voltage $V_O$ of the power converter. When the switching signal $S_W$ becomes logic-high, a primary-side switching current $I_P$ will be generated accordingly. A current-sense resistor 30 coupled to the power transistor 20 can serve as a current-sense device. A current-sense signal $V_{CS}$ is generated at a join of the current-sense resistor 30 and the transistor 20, and applied to a sense terminal CS of the switching controller 100. The detailed description of the primary-side controlled power converter can be found in the following: U.S. Pat. No. 6,977,824, entitled "Control circuit for controlling output current at the primary side of a power converter", and U.S. Pat. No. 7,016,204, entitled "Close-loop PWM controller for primary-side controlled power converters".

The waveform of the signal $V_S$ is schematically shown in FIG. 2. The signal $V_S$ is generated during the off-time period of the switching signal $S_W$. After a blanking period $T_{BLK}$ elapses, the signal $V_S$ can be stable and related to the output voltage $V_O$. However, the leakage inductance of the transformer 10 and the drain capacitance of the power transistor 20 cause a ringing signal $V_{RING}$ with a ringing period $T_{RING}$ in the signal $V_S$. In addition, the reflected voltage $V_A$ includes the ringing signal $V_{RING}$ due to the voltage divider, which causes undesired values in the signal $V_S$.

FIG. 3 shows another schematic circuit of a conventional primary-side controlled power converter. A capacitor 58 is connected to the join of the resistors 51 and 57 and ground so as to reduce the ringing signal $V_{RING}$ in the signal $V_S$. The resistors 51 and 57 and the capacitor 58 develop a low-pass filter. However, the low-pass filter causes distortion and sample errors of the signal $V_S$. FIG. 4 shows the distorted waveform of the signal $V_S$ during the off-time period of the switching signal $S_W$. Because of the low-pass filter, the waveform of the signal $V_S$ is distorted and the rising time of the signal $V_S$ is prolonged, which causes sampling errors when the pulse width of the signal $V_S$ is short. For example, when the load is in a light-load or no-load condition, the pulse width of the signal $V_S$ is too short to be accurately sampled by the controller 100 for generating the voltage feedback signal because of the small pulse width of the switching signal $S_W$. Sample errors result in an incorrect voltage feedback signal (lower value of the voltage feedback signal) and cause an increment in the output voltage $V_O$. In other words, the output voltage $V_O$ will be too high because the controller 100 senses an incorrect voltage feedback signal. Furthermore, the distorted waveform and the prolonged settling-time period $T_D$ of the signal $V_S$ limit the maximum speed and the maximum frequency of the switching signal $S_W$.

SUMMARY OF THE INVENTION

An object of this invention is to filter out the ringing signal $V_{RING}$ without prolonging the settling-time period $T_D$. The present invention provides an adaptive filter circuit for a primary-side controlled power converter to sample the reflected voltage of a transformer. The reflected voltage of the transformer is utilized to regulate the output voltage and output current for the power converter.

To achieve the foregoing object, the present invention provides an adaptive filter circuit for sampling a reflected voltage of a transformer of a power converter, comprising: a first switch for receiving the reflected voltage; a resistor having a first terminal and a second terminal, the first terminal of the resistor being coupled to the first switch; a capacitor coupled to the second terminal of the resistor for holding the reflected voltage; and a second switch coupled to the resistor in parallel; wherein the resistor and the capacitor develop a filter for sampling the reflected voltage; the reflected voltage is sampled without filtering by the filter in a first period during a disable period of a switching signal; and the reflected voltage is sampled with filtering by the filter in a second period during the disable period of the switching signal.

In the foregoing adaptive filter circuit, the first period and the second period are determined by the first switch and the second switch.

In the foregoing adaptive filter circuit, the second period starts after an end of the first period.

In the foregoing adaptive filter circuit, the reflected voltage is sampled to generate a feedback signal for the power converter; the reflected voltage is correlated to an output voltage of the power converter.

In the foregoing adaptive filter circuit, the first switch is turned on during the first period and the second period.

In the foregoing adaptive filter circuit, the second switch is turned off during the second period.

In the foregoing adaptive filter circuit, the feedback signal is a voltage-feedback signal.

To achieve the aforementioned object, the present invention further provides an adaptive filter circuit for sampling a reflected voltage of a transformer of a power converter, comprising: sample-and-hold circuit for receiving the reflected voltage; and a resistor coupled to the sample-and-hold circuit; wherein the resistor and a capacitor of the sample-and-hold circuit develop a filter for sampling the reflected voltage; the reflected voltage is sampled without filtering by the filter in a first period; and the reflected voltage is sampled with filtering by the filter in a second period.

To achieve the aforementioned object, the present invention further provides an adaptive filter circuit for sampling a reflected voltage of a transformer of a power converter, comprising: a first switch for receiving the reflected voltage; a filter coupled to the first switch and comprising a resistor and a capacitor for sampling the reflected voltage; and a second switch coupled to the resistor in parallel; wherein the reflected voltage is sampled without filtering by the filter in a first period during a discharge period of the transformer; and the reflected voltage is sampled with filtering by the filter in a second period during the discharge period of the transformer.

To achieve the aforementioned object, the present invention further provides a method for sampling a reflected voltage of a transformer of a power converter, comprising: receiving the reflected voltage after a switching signal is disabled; disabling a ringing elimination module in a first period, and during the first period the reflected voltage comprises ringing signals; enabling the ringing elimination module in a second period, and during the second period the ringing signals of the reflected voltage are eliminated; wherein the ringing elimination module is coupled to the reflected voltage, and the switching signal is used for switching the transformer.

DESCRIPTION OF THE DETAILED EMBODIMENT

Embodiments of the present invention and their advantages are best understood by referring to the attached drawings. Like numerals are used for like and corresponding parts of the various drawings.

Figure 5:
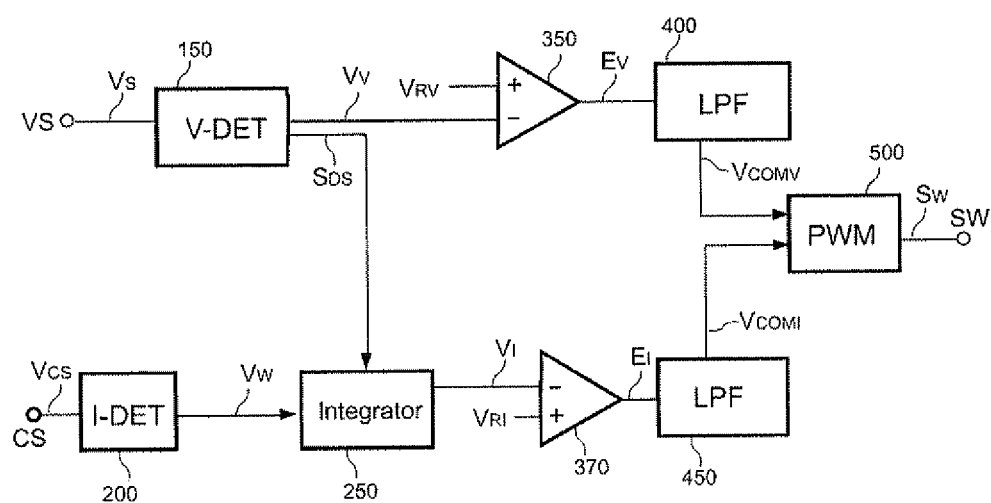
FIG. 5 illustrates a block diagram of a preferred embodiment of a controller for primary-side controlled power converter according to the present invention.

FIG. 5 is a block diagram of a preferred embodiment of a controller 100' for primary-side controlled power converter according to the present invention. The controller 100' has similar functions as the switching controller 100 in FIG. 1 but possesses novel features of the present invention. The controller 100' comprises a voltage-detection circuit (V-DET) 150, a current-detection circuit (I-DET) 200, an integrator 250, an error amplifier 350, an error amplifier 370, a low-pass filter (LPF) 400, a low-pass filter (LPF) 450, and a PWM circuit (PWM) 500.

Figure 1:
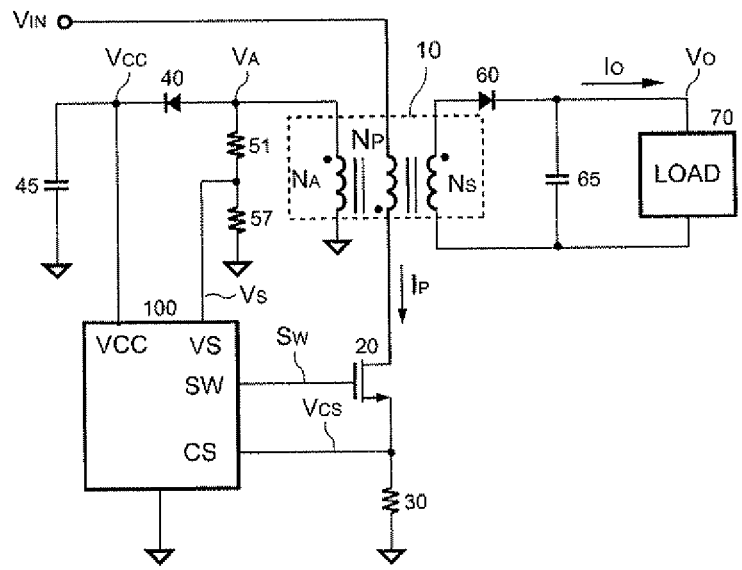
FIG. 1 illustrates a schematic circuit of a conventional primary-side controlled power converter.
Figure 2:
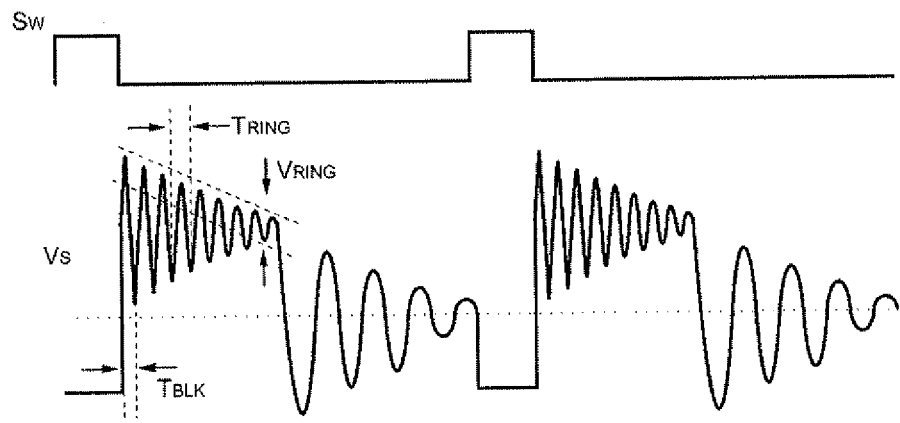
FIG. 2 illustrates the waveform of the signal $V_S$ in the conventional primary-side controlled power converter of FIG. 1.

The voltage-detection circuit 150 is coupled to the detection terminal VS shown in FIG. 1 to receive the signal $V_S$ for generating a voltage-feedback signal $V_V$ and a discharge-time signal $S_{DS}$. A reference signal $V_{RV}$ is supplied to a positive input of the error amplifier 350, and the voltage-feedback signal $V_V$ is received at a negative input of the error amplifier 350. The error amplifier 350 outputs an amplified signal $E_V$ for amplifying an error between the voltage-feedback signal $V_V$ and the reference signal $V_{RV}$, and providing a voltage loop gain in response to the reference signal $V_{RV}$. The voltage loop gain is used for outputting voltage control. The amplified signal $E_V$ is received by the low-pass filter 400 to generate a voltage-loop signal $V_{COMV}$ for the frequency compensation of the voltage loop.

The current-detection circuit 200 is coupled to the current-sense terminal CS shown in FIG. 1 to receive a current-sense signal $V_{CS}$ so as to generate a current-waveform signal $V_W$. The integrator 250 is coupled to the current-detection circuit 200 and the voltage-detection circuit 150 for generating a current-feedback signal $V_I$ in accordance with the current-waveform signal $V_W$ and the discharge-time signal $S_{DS}$. The current-waveform signal $V_W$ is generated by measuring the primary-side switching current $I_P$ shown in FIG. 3. The current-feedback signal $V_I$ is generated by integrating the current-waveform signal $V_W$ with the discharge-time signal $S_{DS}$. The current-feedback signal $V_I$ is further applied to a negative input of the error amplifier 370, and a reference signal $V_{RI}$ is applied to a positive input of the error amplifier 370. The error amplifier 370 generates an amplified signal $E_I$ for amplifying an error between the current-feedback signal $V_I$ and the reference signal $V_{RI}$ and providing a current loop gain in response to the reference signal $V_{RI}$. The current loop gain is used for outputting current control.

The low-pass filter 450 receives the amplified signal $E_I$ to generate a current-loop signal $V_{COMI}$ for the frequency compensation of the current loop. The PWM circuit 500 generates the switching signal $S_W$ and controls a pulse width of the switching signal $S_W$ in response to the voltage-loop signal $V_{COMV}$ and the current-loop signal $V_{COMI}$. Therefore, the controller 100' receives the signal $V_S$ to generate the switching signal $S_W$.

Figure 6:
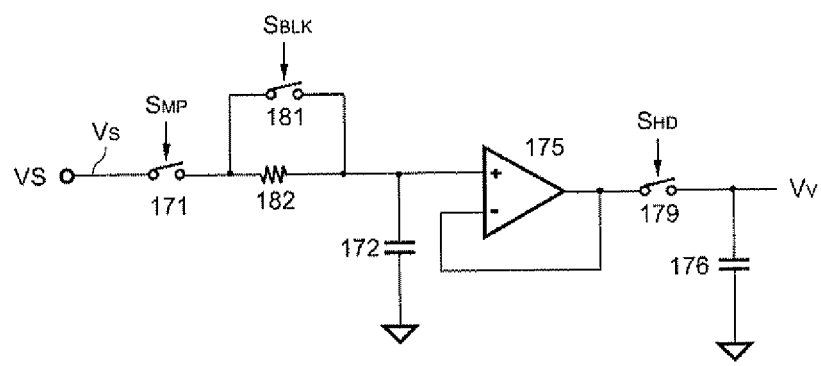
FIG. 6 illustrates a preferred embodiment of the voltage-detection circuit according to the present invention.

FIG. 6 is a preferred embodiment of the voltage-detection circuit 150 according to the present invention, which comprises an adaptive filter circuit for sampling the signal $V_S$ generated at the detection terminal VS shown in FIG. 1. The adaptive filter circuit includes a sample-and-hold circuit formed by a first switch 171 and a capacitor 172, a second switch 181, a resistor 182, a buffer amplifier 175, a third switch 179 and a capacitor 176. The resistor 182 and the capacitor 172 are configured for forming a filter. The signal $V_S$ is correlated to the reflected voltage $V_A$ of the transformer 10. The first switch 171 receives the signal $V_S$ to sample the reflected voltage $V_A$. The resistor 182 is coupled to the first switch 171 and the second switch 181. The capacitor 172 is coupled to the resistor 182 and a positive input terminal of the buffer amplifier 175. A control terminal of the first switch 171 is controlled by a sample signal $S_{MP}$. When the sample signal $S_{MP}$ is enabled and the first switch 171 is turned on, the signal $V_S$ is sampled into the capacitor 172 through the resistor 182. That is, the capacitor 172 is coupled to the first switch 171 to hold the reflected voltage $V_A$ once the sample signal $S_{MP}$ is enabled and the first switch 171 is turned on.

The second switch 181 is connected to the resistor 182 in parallel. A control terminal of the second switch 181 is controlled by a blanking signal $S_{BLK}$. No current will pass through the resistor 182 when the blanking signal $S_{BLK}$ is enabled and the second switch 181 is turned on. A negative input terminal and a output terminal of the buffer amplifier 175 are connected together. The third switch 179 is connected to the output terminal of the buffer amplifier 175 and the capacitor 176. A control terminal of the third switch 179 is controlled by a hold signal $S_{HD}$. The third switch 179 controlled by the hold signal $S_{HD}$ is configured for sampling a stored signal in the capacitor 172, and passing the stored signal to the capacitor 176 to generate the voltage-feedback signal $V_V$. The filter formed by the resistor 182 and the capacitor 172 has a pole at $$f_P = \frac{1}{2\pi \times R_{182} \times C_{172}} \quad (1)$$

in which the resistance of resistors 51 and 57 is ignored.

Figure 7:
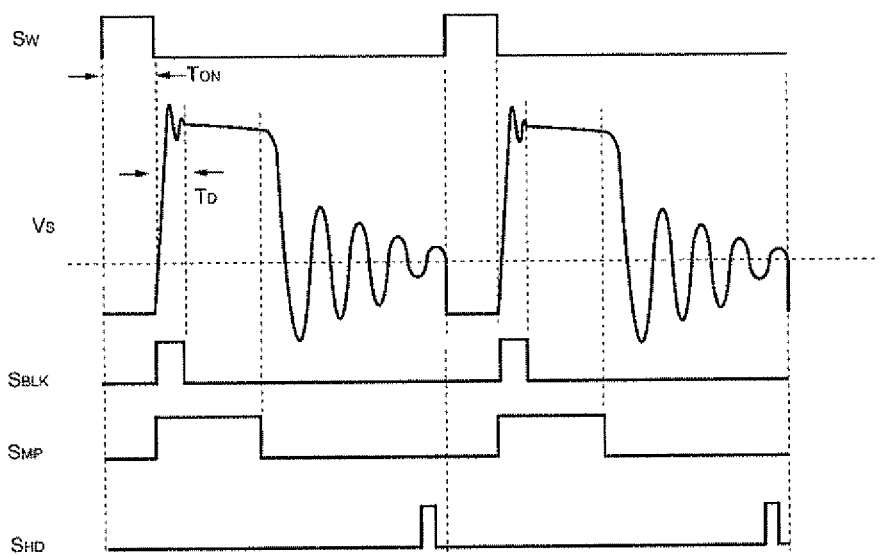
FIG. 7 illustrates the waveforms of the switching signal $S_W$, the signal $V_S$, the blanking signal $S_{BLK}$, the sample signal $S_{MP}$ and the hold signal $S_{HD}$.

The waveforms of the switching signal $S_W$, the signal $V_S$, the blanking signal $S_{BLK}$, the sample signal $S_{MP}$ and the hold signal $S_{HD}$ are shown in FIG. 7. The signal $V_S$ is generated during the off-time period of the switching signal $S_W$. The blanking signal $S_{BLK}$ and the sample signal $S_{MP}$ are also generated during the off-time period of the switching signal $S_W$. The sample signal $S_{MP}$ is configured not to be disabled before the end of the blanking signal $S_{BLK}$. As shown in FIG. 6, the filter formed by the resistor 182 and the capacitor 172 receives the signal $V_S$ to sample the reflected voltage $V_A$. During disabling of the switching signal $S_W$, the reflected voltage $V_A$ is sampled into the capacitor 172 in a first period and a second period. The first period and the second period are determined by turning on and turning off the first switch and the second switch. The second period starts after an end of the first period. The first switch 171 is turned on during the first period and the second period. The second switch 181 is turned off during the second period. In other words, the filter is enabled during the second period and disabled during the first period. The techniques of generating the sample signal $S_{MP}$ can be found in the following: U.S. Pat. No. 7,349,229 entitled "Causal sampling circuit for measuring reflected voltage and demagnetizing time of transformer", and U.S. Pat. No. 7,486,528 entitled "Linear-predict sampling for measuring demagnetized voltage of transformer". The hold signal $S_{HD}$ is generated before the starting of the switching signal $S_W$, and is only enabled when the switching signal $S_W$ is disabled.

During the enable of the blanking signal $S_{BLK}$, which corresponds to a period of the rising edge of the signal $V_S$, the signal $V_S$ is sampled without filtering because the second switch 181 is turned on by the blanking signal $S_{BLK}$ and no current passes through the resistor 182. After the blanking signal $S_{BLK}$ is disabled, the ringing signal $V_{RING}$ is filtered out by the low-pass filter formed by the resistor 182 and the capacitor 172.

Figure 3:
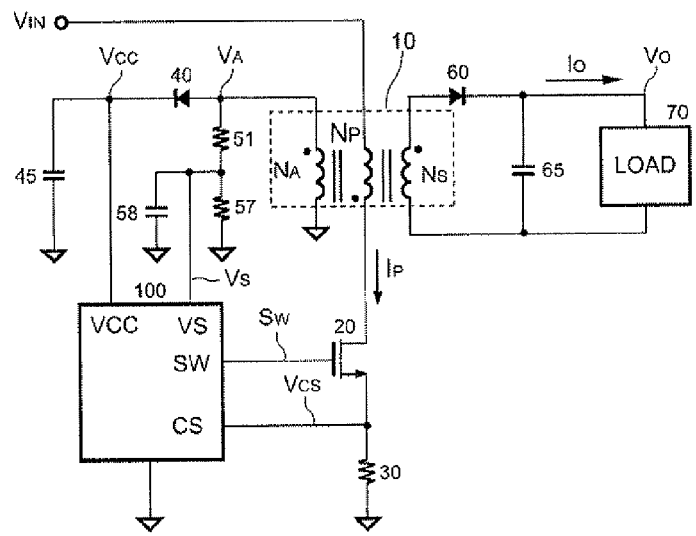
FIG. 3 illustrates another schematic circuit of a conventional primary-side controlled power converter.
Figure 4:
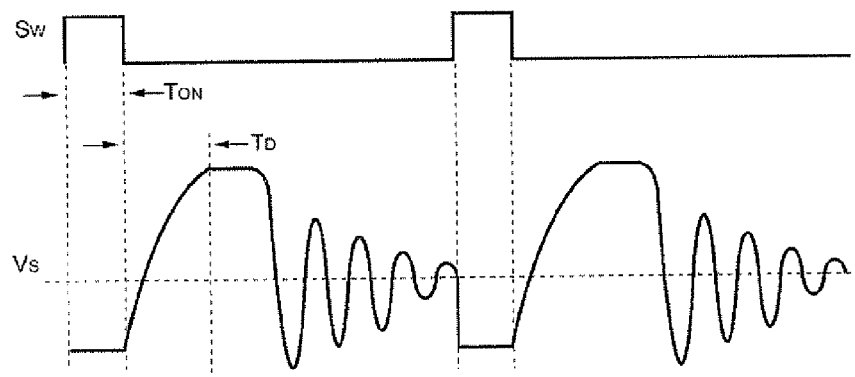
FIG. 4 illustrates the distorted waveform of the signal $V_S$ during the off-time period of the switching signal $S_W$ in the conventional primary-side controlled power converter of FIG. 3.

Through the adaptive filter circuit, the signal $V_S$ can be sampled more accurately to obtain the waveform in FIG. 7 rather than the distorted waveform in FIG. 4, and the capacitor 58 shown in FIG. 3 is not needed. Therefore, the impacts of the long rising time and settling-time period $T_D$ of the signal $V_S$ can be avoided. Further, when the load is in light-load or no-load condition, the high output voltage due to the small pulse width of the signal $V_S$ can also be avoided.

Although the present invention and the advantages thereof have been described in detail, it should be understood that various changes, substitutions, and alternations can be made therein without departing from the spirit and scope of the invention as defined by the appended claims. That is, the discussion included in this invention is intended to serve as a basic description. It should be understood that the specific discussion may not explicitly describe all embodiments possible; many alternatives are implicit. The generic nature of the invention may not fully explained and may not explicitly show that how each feature or element can actually be representative of a broader function or of a great variety of alternative or equivalent elements. Again, these are implicitly included in this disclosure. Neither the description nor the terminology is intended to limit the scope of the claims.

What is claimed is:

1. An adaptive filter circuit for sampling a reflected voltage of a transformer of a power converter during a first sampling period in which the reflected voltage is sampled without filtering and a second sampling period during which the reflected voltage is sampled with filtering, comprising:
   a first switch for receiving the reflected voltage, said first switch being controlled to enable sampling during the first and second sampling periods;
   a capacitor coupled to the first switch for holding the reflected voltage when the first switch is closed;
   a resistor coupled to the first switch; and
   a second switch coupled to the resistor, said second switch being controlled to disable filtering during the first sampling period and to enable sampling during the second sampling period;
   wherein, during the first sampling period, the reflected voltage is sampled and held directly by the capacitor without filtering, and
   wherein, during the second sampling period, the resistor and the capacitor form a filter for filtering the reflected voltage held by the capacitor.

2. The adaptive filter circuit as claimed in claim 1, wherein the first sampling period and the second sampling period are determined by turning on and turning off the first switch and the second switch.

3. The adaptive filter circuit as claimed in claim 1, wherein the second period starts after an end of the first sampling period.

4. The adaptive filter circuit as claimed in claim 1, wherein the reflected voltage is sampled to generate a feedback signal for the power converter; the reflected voltage is correlated to an output voltage of the power converter.

5. The adaptive filter circuit as claimed in claim 1, wherein the first switch is turned on during the first sampling period and the second sampling period.

6. The adaptive filter circuit as claimed in claim 1, wherein the second switch is turned off during the second sampling period.

7. The adaptive filter circuit as claimed in claim 1, wherein the second switch is coupled to the resistor in parallel.

8. The adaptive filter circuit as claimed in claim 4, wherein the feedback signal is a voltage-feedback signal.

9. An adaptive filter circuit for sampling a reflected voltage of a transformer of a power converter during a first sampling period in which the reflected voltage is sampled without filtering and a second sampling period during which the reflected voltage is sampled with filtering, comprising:
   a sample-and-hold circuit coupled to sample the reflected voltage; and a filter coupled to the sample-and-hold circuit;
wherein during a first period of the reflected voltage, the reflected voltage is sampled by the sample-and-hold circuit without filtering by the filter; and
wherein, during a second period of the reflected voltage, the reflected voltage is sampled by sample-and-hold circuit and filter by the filter.

10. The adaptive filter circuit as claimed in claim 9, wherein the second period starts after an end of the first period.

11. The adaptive filter circuit as claimed in claim 9, wherein the filter is enabled during the second period.

12. The adaptive filter circuit as claimed in claim 9, wherein the filter is disabled during the first period.

13. The adaptive filter circuit as claimed in claim 9, wherein the filter is connected to a first switch and a second switch, said first switch being controlled to enable sampling during the first and second sampling periods, and said second switch being controlled to disable filtering during the first sampling period and to enable sampling during the second sampling period.

14. The adaptive filter circuit as claimed in claim 13, wherein the filter further comprises a resistor and a capacitor, and the resistor is coupled in parallel to the second switch.

15. The adaptive filter circuit as claimed in claim 13, wherein the first switch is turned on in the first period and in the second period, and the second switch is turned on in the first period and turned off in the second period.

16. An adaptive filter circuit for sampling a reflected voltage of a transformer of a power converter during a first sampling period in which the reflected voltage is sampled without filtering and a second sampling period during which the reflected voltage is sampled with filtering, comprising:
a first switch for receiving the reflected voltage, said first switch being controlled to enable sampling during the first and second sampling periods;
a filter coupled to the first switch and comprising a resistor and a capacitor for sampling the reflected voltage; and
a second switch coupled to the resistor in parallel such said second switch controls whether said filter filters the reflected voltage during said first and second sampling periods;
wherein the reflected voltage is sampled without filtering by the filter in a first period during a discharge period of the transformer; and the reflected voltage is sampled with filtering by the filter in a second period during the discharge period of the transformer.

17. The adaptive filter circuit as claimed in claim 16, wherein the first period and the second period are determined by the first switch and the second switch.

18. The adaptive filter circuit as claimed in claim 16, wherein the first switch is turned on during the first period and the second period.

19. The adaptive filter circuit as claimed in claim 16, wherein the second switch is turned off during the second period.

20. A method for sampling a reflected voltage of a transformer of a power converter, comprising:
receiving the reflected voltage after a switching signal is disabled;
disabling a ringing signal filtering module in a first period, wherein during the first period the sampled reflected voltage comprises ringing signals;
enabling the ringing signal filtering module to filter the ringing signals in a second period, wherein during the second period the ringing signals of the sampled reflected voltage are eliminated;
wherein the ringing signal filtering module is coupled to receive the reflected voltage, and the switching signal is used for switching the transformer.

21. The method as claimed in claim 20, wherein the ringing signal filtering module comprises a filter circuit coupled to the reflected voltage, and a sample-and-hold circuit coupled to the filter.

22. The method as claimed in claim 21, wherein the filter circuit comprises a filter, and a switch coupled to the filter.

23. The method as claimed in claims in 21, wherein disabling a ringing elimination module in a first period comprises disabling the filter circuit.

24. The method as claimed in claim 23, wherein disabling the filter circuit comprises controlling a switch connected in parallel with a resistor in the filter circuit.

25. The method as claimed in claims in 21, wherein enabling the ringing elimination module in a second period comprises enabling the filter circuit.

26. The method as claimed in claim 25, wherein enabling the filter circuit comprises controlling a switch connected in parallel with a resistor in the filter circuit.

* * * * *